(12) United States Patent
Sinusas et al.

(10) Patent No.: US 9,541,188 B2
(45) Date of Patent: Jan. 10, 2017

(54) DIRECT DRIVE ROTATION DEVICE FOR PASSIVELY MOVING FLUID

(71) Applicants: Bell Helicopter Textron Inc., Fort Worth, TX (US); Bell Helicopter Textron Inc., Fort Worth, TX (US)

(72) Inventors: Eric A. Sinusas, Euless, TX (US); Walter West Riley, Richardson, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 50 days.

(21) Appl. No.: 14/532,142

(22) Filed: Nov. 4, 2014

(65) Prior Publication Data

US 2015/0068845 A1    Mar. 12, 2015

Related U.S. Application Data

(62) Division of application No. 13/557,280, filed on Jul. 25, 2012, now Pat. No. 8,905,193.

(51) Int. Cl.
*F16H 57/04* (2010.01)
*B64C 27/12* (2006.01)
(Continued)

(52) U.S. Cl.
CPC ........... *F16H 57/0409* (2013.01); *B64C 27/12* (2013.01); *F16H 57/0427* (2013.01);
(Continued)

(58) Field of Classification Search
CPC  F16H 57/0427; F16H 5/0428; F16H 57/0471; F16N 7/18
(Continued)

(56) References Cited

U.S. PATENT DOCUMENTS 3,848,702 A * 11/1974 Bergman .............. F04C 29/023
184/6.16
5,161,644 A    11/1992 Swenskowski et al.
(Continued)

FOREIGN PATENT DOCUMENTS

CN    1727734 A    2/2006
CN    101586657 A    11/2009
(Continued)

OTHER PUBLICATIONS

Notice of Allowance in related U.S. Pat. Application No. 13557305, dated Dec. 8, 2014, 12 pages.
(Continued)

*Primary Examiner* — William E Dondero
*Assistant Examiner* — Robert T Reese
(74) *Attorney, Agent, or Firm* — Noah A. Tevis

(57) ABSTRACT

The device is configured for moving a fluid within a gearbox. In one illustrative embodiment, the device includes a base portion coupled to a rotatable member within the gearbox. An inlet portion of the device is configured to draw the fluid from a reservoir portion of the gearbox. The device is configured to utilize a centrifugal force for moving the fluid from the inlet portion toward the base portion along an interior surface of a conical portion. In another illustrative embodiment, the device includes a conical portion having an external threaded portion configured to capture a fluid during a rotation of the device. In such an embodiment, the threaded portion is configured to utilize a centrifugal force for moving the fluid captured by the threaded portion along an exterior surface of the conical portion.

9 Claims, 7 Drawing Sheets

(51) Int. Cl.
*F16N 7/18* (2006.01)
*F16H 1/14* (2006.01)

(52) U.S. Cl.
CPC ..... *F16H 57/0428* (2013.01); *F16H 57/0436* (2013.01); *F16H 57/0443* (2013.01); *F16H 57/0471* (2013.01); *F16H 57/0495* (2013.01); *F16N 7/18* (2013.01); *F16H 1/14* (2013.01); *Y10T 74/19991* (2015.01)

(58) Field of Classification Search
USPC ......... 184/6.11, 6.12, 6.16, 27.1, 77; 74/467
See application file for complete search history.

(56) References Cited

U.S. PATENT DOCUMENTS

| | | | |
|---|---|---|---|
| 6,666,301 B2 * | 12/2003 | Kim | F04B 39/0246 184/6.16 |
| 7,900,535 B2 | 3/2011 | Usami et al. | |
| 8,801,399 B2 * | 8/2014 | Kim | F04B 39/0246 184/6.16 |
| 8,997,937 B2 * | 4/2015 | Sinusas | F16H 1/14 184/27.1 |
| 2002/0170778 A1 * | 11/2002 | Kim | F04B 39/0246 184/6.16 |
| 2006/0013706 A1 * | 1/2006 | Ishida | F04B 39/0261 417/386 |
| 2014/0026702 A1 * | 1/2014 | Sinusas | B64C 27/12 74/467 |

FOREIGN PATENT DOCUMENTS

| | | |
|---|---|---|
| CN | 101749410 A | 6/2010 |
| DE | 102008060530 A1 | 6/2010 |
| JP | 5388676 U | 7/1978 |
| JP | 6018641 A | 1/1985 |
| JP | 61-55473 A | 3/1986 |

OTHER PUBLICATIONS

Office Action in related Canadian Pat. Application No. 2,821,120, dated Jan. 27, 2015, 4 pages.
Notice of Allowance in related Canadian Pat. Application No. 2,821,120, dated Oct. 14, 2015, 1 page.
Office Action in related Canadian Pat. Application No. 2,821,180, dated Jan. 29 2015, 4 pages.
Notice of Allowance in related Canadian Pat. Application No. 2,821,180, dated Oct. 22, 2015, 1 page.
Office Action in related Chinese Pat. Application No. 201310306052.7, dated Jul. 2, 2015, 6 pages.
Office Action in related Chinese Pat. Application No. 201310306052.7, dated Aug. 19, 2015, 4 pages.
Office Action in related Chinese Pat. Application No. 201310306167.6, dated Jul. 3, 2015, 8 pages.
Office Action in related Chinese Pat. Application No. 201310306167.6, dated May 25, 2016, 6 pages.

* cited by examiner

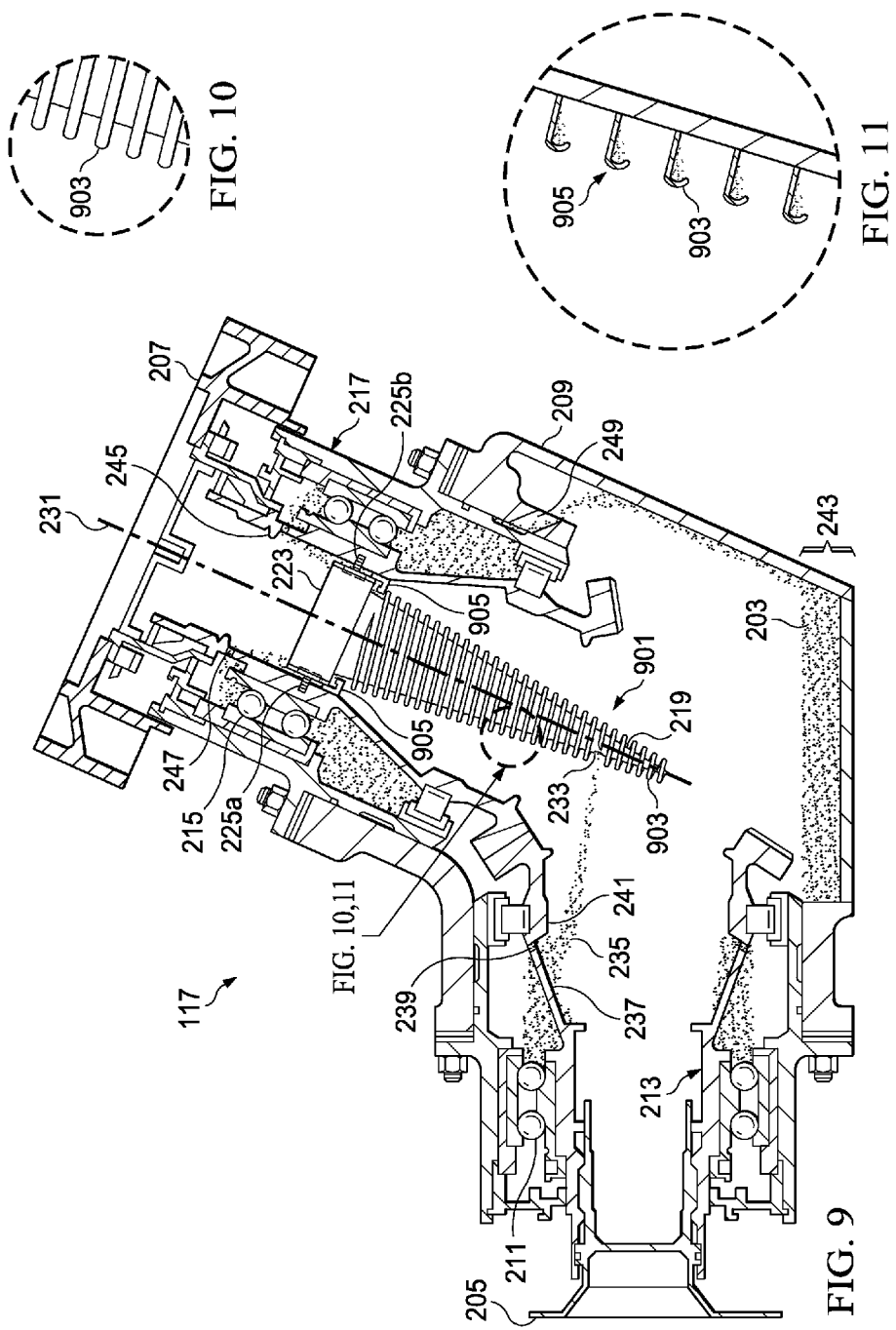

DIRECT DRIVE ROTATION DEVICE FOR PASSIVELY MOVING FLUID

BACKGROUND

Technical Field

The present application relates to a direct drive rotation device configured for passively moving fluid.

Description of Related Art

Conventionally, fluid pumps can be used to move lubrication/cooling fluid within a gearbox, transmission, or other mechanical system that may require lubrication/cooling. A conventional gearbox fluid pump is configured to draw fluid from a sump and pump the fluid against gravitational forces to a desired location. Conventional fluid pumps have significant disadvantages, such as: many vulnerabilities to operational failure (including fluid transfer lines), increased certification requirements (in an aircraft implementation), expense, complexity, and maintenance requirements, to name a few.

Hence, there is a need for an improved device for moving fluid against the forces of gravity.

DESCRIPTION OF THE DRAWINGS

The novel features believed characteristic of the apparatus of the present application are set forth in the appended claims. However, the apparatus itself, as well as a preferred mode of use, and further objectives and advantages thereof, will best be understood by reference to the following detailed description when read in conjunction with the accompanying drawings, wherein:

FIG. 9 is a sectional view, taken at section lines 9-9, of a device in the gearbox, according to one example embodiment;

FIG. 10 is a detail view of a portion of the device from FIG. 9, according to one example embodiment;

FIG. 11 is a detail view of a portion of the device from FIG. 9, according to one example embodiment.

DESCRIPTION OF THE PREFERRED EMBODIMENT

Illustrative embodiments of the apparatus are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The apparatus of the present application is a direct drive rotation device configured for passively moving fluid. More specifically, the direct drive rotation device is configured to passively move lubrication/cooling fluid within a gearbox, or other mechanical system that utilizes lubrication/cooling fluid. The apparatus is capable of efficiently moving fluid against gravity to desired locations within a gearbox. Further, the apparatus is configured to be direct drive and passively move fluid, thereby precluding certification requirements that may be necessitated by using a conventional pump to move fluid within a gearbox. The apparatus is also configured to accurately and effectively move fluid to desired locations within a gearbox. Further, some embodiments of the apparatus have the ability to catch ambient fluid and redistribute to desired locations within a gearbox. These and other advantages of the apparatus are further described herein. Certain embodiments of the present application may include some, all, or none of the above advantages. One or more other technical advantages may be readily apparent to those skilled in the art from the figures, descriptions, and claims included herein.

Figure 1:
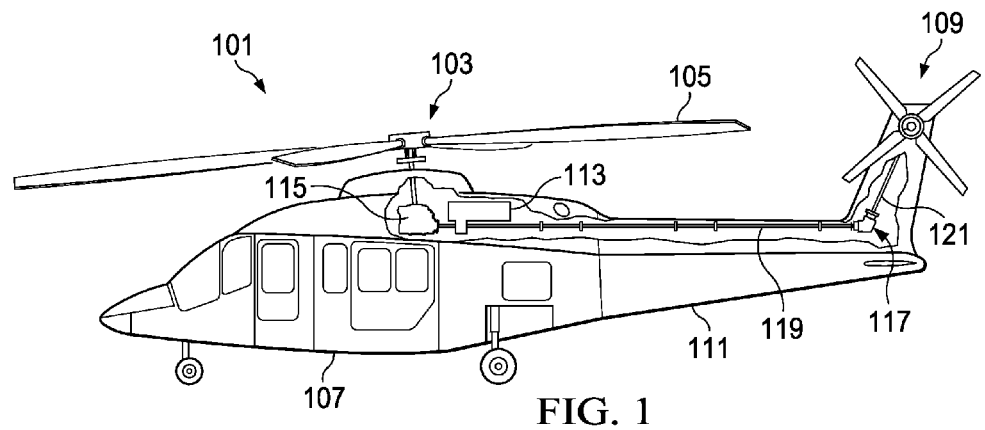
FIG. 1 is a side view of an aircraft having a gearbox, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. Rotorcraft 101 further includes a fuselage 107, anti-torque system 109, and an empennage 111. Torque is supplied to rotor system 103 and anti-torque system 109 with at least one engine 113. A main rotor gearbox 115 is operably associated with the engine main output driveshaft and the main rotor mast. Further, an intermediate gearbox 117 is operably associated with a tail rotor drive shaft 119 and a tail rotor drive shaft 121.

Figure 2:
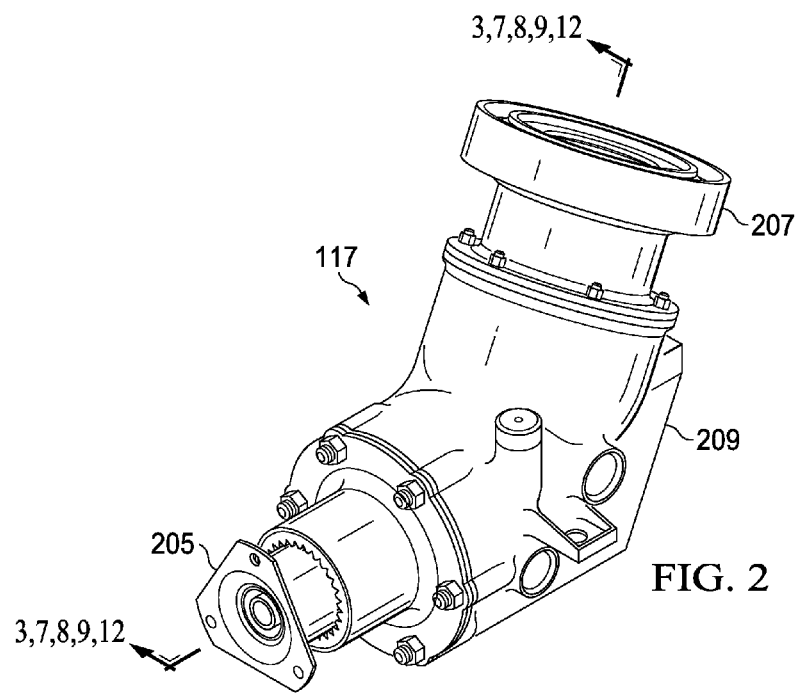
FIG. 2 is a perspective view of the gearbox, according to one example embodiment.
Figure 3:
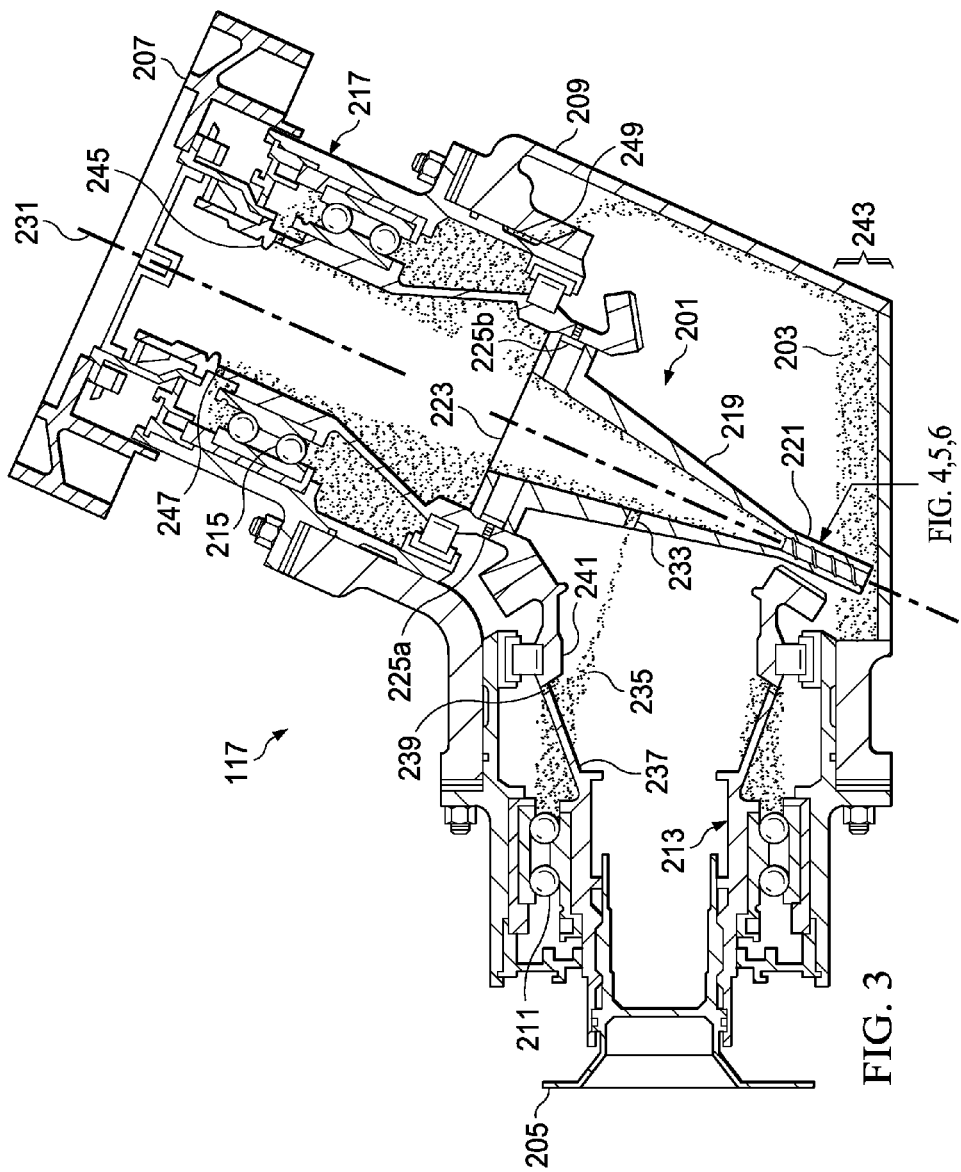
FIG. 3 is a sectional view, taken at section lines 3-3, of a device in the gearbox, according to one example embodiment.
Figure 4:
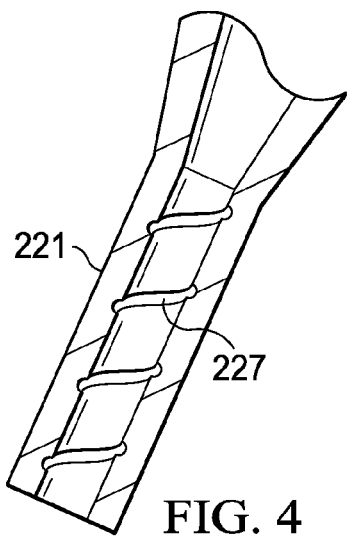
FIG. 4 is a detail view of a portion of the device from FIG. 3, according to one example embodiment.

Referring now also to FIGS. 2-4, intermediate gearbox 117 includes a direct drive rotation device 201 configured to passively move a fluid 203 to desired locations within gearbox 117. For example, device 201 is configured to move fluid 203 against the forces of gravity. Device 201 can be categorized as direct drive for being coupled to a rotating portion of gearbox 117, thereby passively rotating without active command, or use of sequential, subsequent, fluid transfer systems (e.g., fluid lines), during operation of the gearbox 117.

Gearbox 117 can include an input member 205 that is coupled to tail rotor drive shaft 119. Similarly, gearbox 117 can include an output member 207 that is coupled to tail rotor drive shaft 121. Gearbox 117 is configured to transition torque from along the axis of tail rotor drive shaft 119 to along the axis of tail rotor drive shaft 121. The gearbox 117 includes a housing 209. An input rotating member 213 is rotatable relative to housing 209 with an input duplex bearing 211 operably associated therebetween. Similarly, an output rotating member 217 is rotatable relative to housing 209 with an output duplex bearing 215 operably associated therebetween. During operation, it can be necessary to supply lubrication/cooling fluid 203 to bearings, seals, and other gearbox related components. In the illustrated embodiment, device 201 is configured to supply lubrication/cooling fluid to input duplex bearing 211 and output duplex bearing 215. It should be appreciated that the exact configuration of device 201 is implementation specific. Further, one of ordinary skill in art with benefit of this disclosure would recognize that device 201 can be modified to selectively collect and supply fluid to various components within a gearbox.

In the illustrated embodiment, device 201 has a conical portion 219, an inlet portion 221, and a base portion 223. It should be appreciated that even though conical portion 219, inlet portion 221, and base portion 223 are illustrated as an integral device, an alternative embodiment can include the segregation of conical portion 219, inlet portion 221, and base portion 223 into individual components operably associated to each other. Device 201 can be coupled to output rotating member 217 with fasteners 225a and 225b, for example. It should be appreciated that device 201 can be coupled to output rotating member 217 in a variety of configurations using any variety of suitable components.

Figure 5:
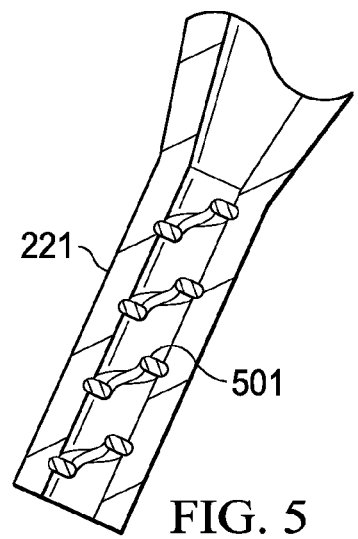
FIG. 5 is an alternative embodiment detail view of a portion of the device, according to one example embodiment.
Figure 6:
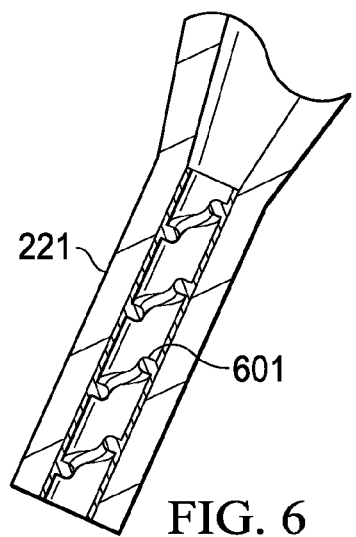
FIG. 6 is an alternative embodiment detail view of a portion of the device, according to one example embodiment.

Inlet member 221 is a narrow cylindrical portion having a threaded portion 227 on the interior of inlet member 221, the threaded portion 227 being configured to move fluid during rotation of device 201. In the illustrated embodiment, threaded portion 227 includes threads machined into the interior of inlet portion 221. Referring briefly to FIG. 5, an alternative embodiment of inlet portion 221 includes a threaded insert 501 that is threaded into recessed grooves in threaded portion 227. Referring briefly to FIG. 6, an alternative embodiment of inlet portion 221 includes an insert 601 having an internal auger configuration. Insert 601 can be press fit, threaded, and/or bonded to the interior of inlet portion 221, for example. FIGS. 4-6 are illustrative of a wide variety of possible configurations of inlet portion 221.

During operation, device 201 rotates in conjunction with output rotating member 217, both device 201 and output rotating member 217 having a common axis of rotation 231. The exact rotational speed of device 201 and output rotating member 217 is implementation specific, but in one example embodiment, device 201 and output rotating member 217 rotate at approximately 4500 revolutions per minute. Rotation of device 201 generates outward centrifugal forces perpendicular to axis of rotation 231. Rotation of device 201 causes fluid 203 to be drawn from a reservoir 243 into inlet portion 221 by the lifting of fluid 203 with threaded portion 227. Further, centrifugal forces motivate fluid 203 to gravitate radially outward; as such, once fluid 203 reaches conical portion 219, the centrifugal forces cause fluid 203 to flow in the direction of base portion 223 due to the slope of conical portion 219.

In one example embodiment, an orifice 233 can be strategically placed in conical portion 219 so that a portion of fluid 203 is projected from orifice 233 to a desired area with gearbox 117. Orifice 233 can be selectively sized in accordance with the desired volume of fluid 203 to be projected. In the illustrated embodiment, orifice 233 is sized and located so that a fluid stream 235 of fluid 203 exiting from orifice 233 is deposited on a surface 237 of input rotating member 213 before flowing through a port 239 and onto input duplex bearing 211. After lubricating/cooling input duplex bearing 211, fluid 203 can return to reservoir 243 via a passage. A dam member 241 can be used to direct the flow of fluid through port 239. It should be appreciated that even though a single orifice 233 is illustrated, any plurality of orifices 233 having any variety of shapes and sizes can be used to selectively deposit fluid 203 on one or more components. Further, even though the illustrated embodiment is described using fluid 203 to lubricate/cool bearings, device 201 is equally adaptable to lubricate/cool other components, such as gears.

The portion of fluid 203 that bypasses orifice 233 flows along on the interior surface of conical portion 219 toward the location of output duplex bearing 215. In the illustrated embodiment, an upper portion of base member 223 acts as a dam wall thereby allowing a volume of fluid 203 to accumulate along a recessed portion of output rotating member 217 before accumulating to a height that results in fluid 203 flowing into a passage 247 and onto output duplex bearing 215. A dam 245 can be integrated into output rotating member 217 to prevent fluid 203 from flowing past passage 247. Fluid 203 can return to reservoir 243 via passage 249.

Figure 7:
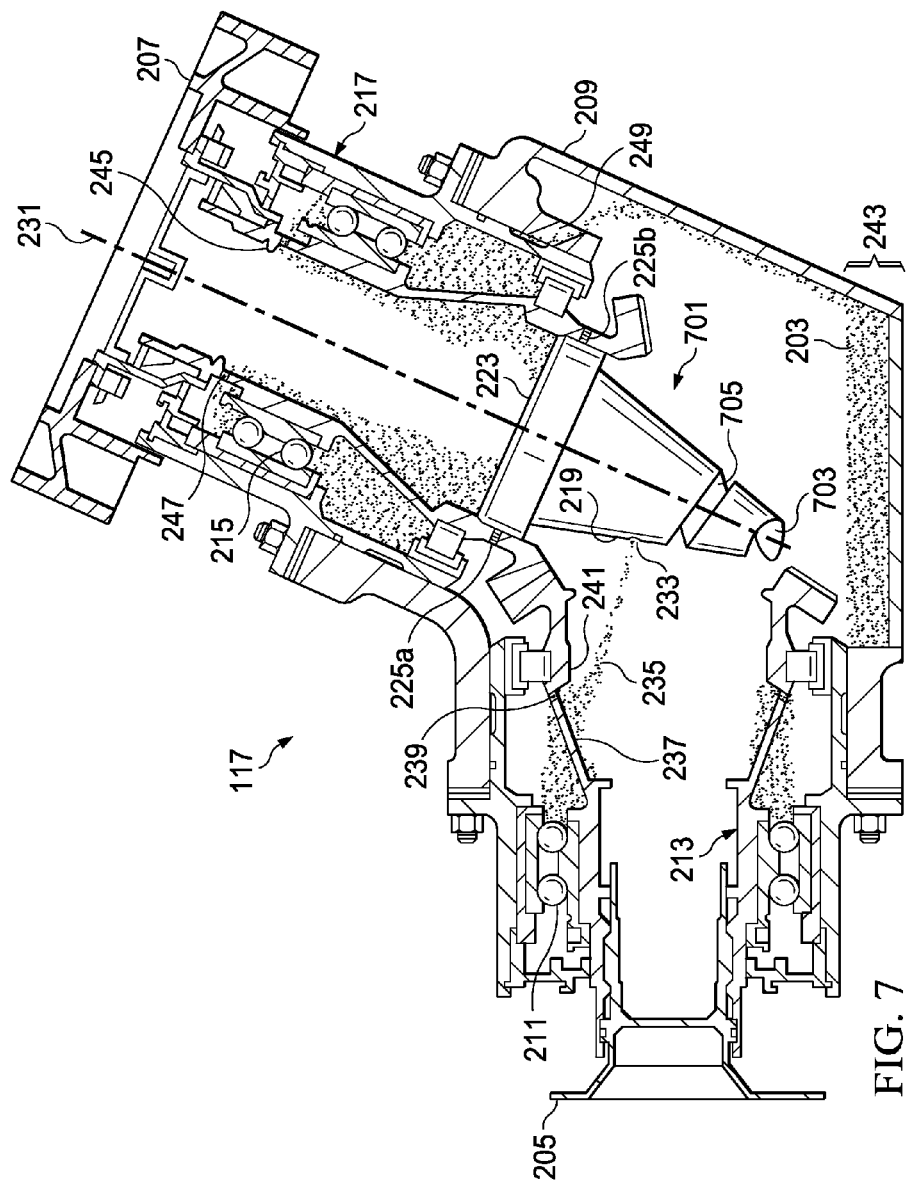
FIG. 7 is a sectional view, taken at section lines 7-7, of a device in the gearbox, according to one example embodiment.

Referring now also to FIG. 7, an alternative embodiment device 701 is illustrated. Device 701 is substantially similar in form and function to device 201, except as noted herein. Thus, disclosure herein regarding device 201 is also applicable to device 701, except as noted herein. Further, device 701 can also incorporate features of devices 801 and 901, therefore it should be appreciated that the disclosure with regard to devices 801 and 901 is also applicable to device 701. Device 701 is configured to capture fluid 203 from the ambient atmosphere with a scoop 703 in lieu of drawing fluid 203 from reservoir with inlet portion 227. However, an alternative embodiment of device 701 can include inlet portion 221 for drawing fluid 203 from the reservoir in addition to scoop 703 for collecting fluid 203 from the ambient atmosphere. Fluid 203 drawn from the ambient atmosphere with scoop 703 can be in the form of relatively small droplets and/or large splashed quantities, for example. Further, a slot 705 can be used to supplement or replace scoop 703. Scoop 703 and slot 705 can be selectively located to catch fluid 203 that is being splashed and/or misted by components with gearbox 117. The interior surface of conical portion 219 can include a lip that prevents fluid that is caught by scoop 703 to exit through slot 705.

Figure 8:
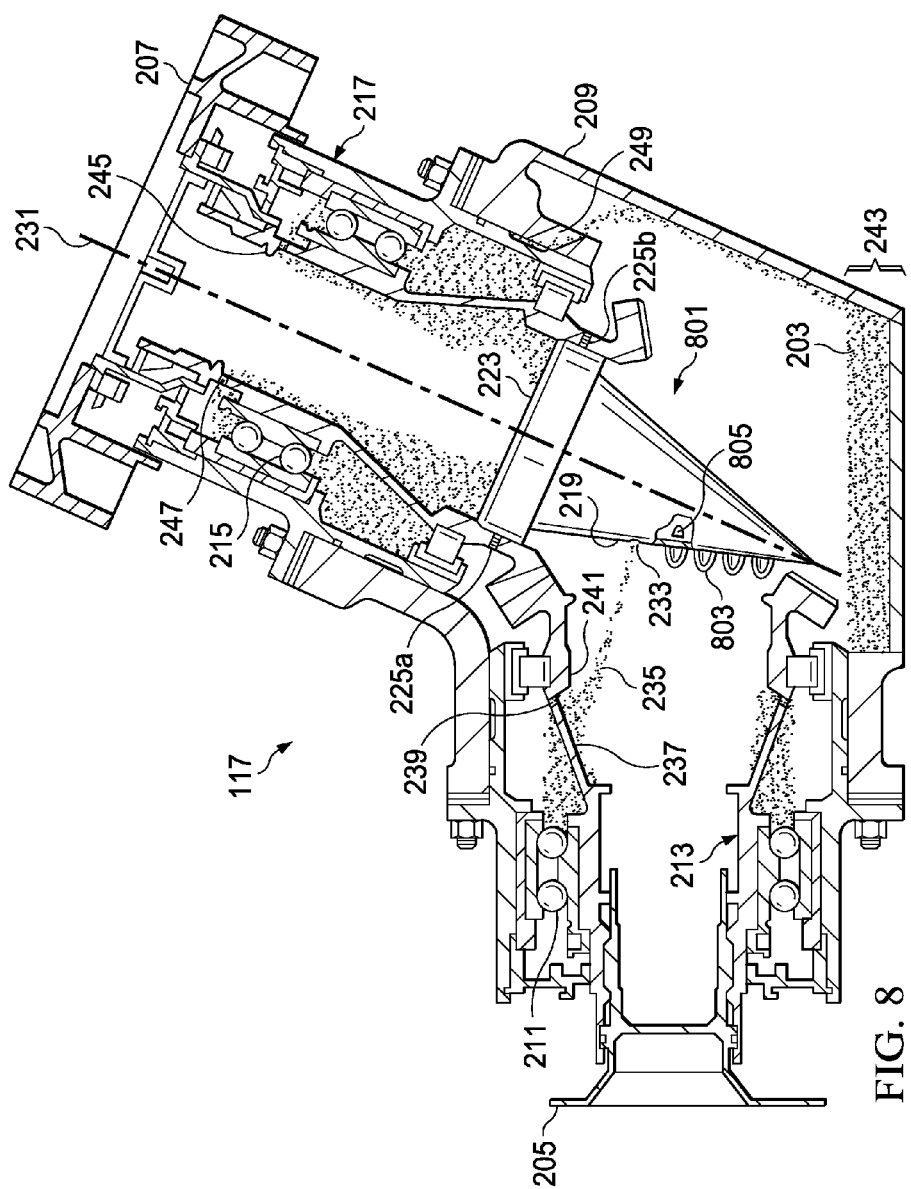
FIG. 8 is a sectional view, taken at section lines 8-8, of a device in the gearbox, according to one example embodiment.

Referring now also to FIG. 8, an alternative embodiment device 801 is illustrated. Device 801 is substantially similar in form and function to device 201, except as noted herein. Thus, disclosure herein regarding device 201 is also applicable to device 801, except as noted herein. Further, device 801 can also incorporate features of devices 701 and 901, therefore it should be appreciated that the disclosure with regard to devices 701 and 901 is also applicable to device 801. Device 801 is configured to capture fluid 203 from the ambient atmosphere with a plurality of ears 803 in lieu of drawing fluid 203 from reservoir with inlet portion 227. However, an alternative embodiment of device 801 can include inlet portion 221 for drawing fluid 203 from the reservoir in addition to ears 803 for collecting fluid 203 from the ambient atmosphere. Fluid 203 drawn from the ambient with ears 803 can be in the form of relatively small droplets and/or large splashed quantities, for example. Further, ears 803 can be selectively located to catch fluid 203 that is being splashed and/or misted by components with gearbox 117. Each ear 803 includes an orifice 805 that allows fluid 203 to migrate to the interior surface of conical portion 219. The interior surface of conical portion 219 can be designed to guide fluid such that it prevents fluid that is caught by ears 803, scoop 703, or inlet portion 221 from exiting back through a downstream ear 803.

Referring now to FIGS. 9-12, an alternative embodiment device 901 is illustrated. Device 901 is substantially similar in form and function to device 201, except as noted herein. Thus, disclosure herein regarding device 201 is also applicable to device 801, except as noted herein. Further, device 901 can also incorporate features of devices 701 and 801, therefore it should be appreciated that the disclosure with regard to devices 701 and 801 is also applicable to device 901. Device 901 is configured to capture fluid 203 from the ambient atmosphere with an external threaded portion 903 in lieu of drawing fluid 203 from reservoir with inlet portion 227. However, an alternative embodiment of device 901 can include inlet portion 221 for drawing fluid 203 from the reservoir in addition to external threaded portion 903 for collecting fluid 203 from the ambient atmosphere. Fluid 203 drawn from the ambient atmosphere with external threaded portion 903 can be in the form of relatively small droplets and/or large splashed quantities, for example. Further, external threaded portion 903 can be selectively located to catch fluid 203 that is being splashed and/or misted by components with gearbox 117. A lip member 905 can be associated with base member 223 and/or output rotating member 217 for catching fluid 203 from the exterior surface of conical portion 219. Further, lip member 905 can be configured to allow fluid to accumulate so that centrifugal forces motivate fluid 203 toward passage 247.

FIGS. 10 and 11 are expanded views of external threaded portion 903. As shown in FIG. 11, external threaded portion 903 includes a concave portion 905 to retain and move fluid 203 toward base member 223 along conical portion 219. External threaded portion 903 is merely illustrative of a wide variety of possible implementation specific configurations for capturing and moving fluid 203 along the exterior surface of conical portion 219.

Figure 12:
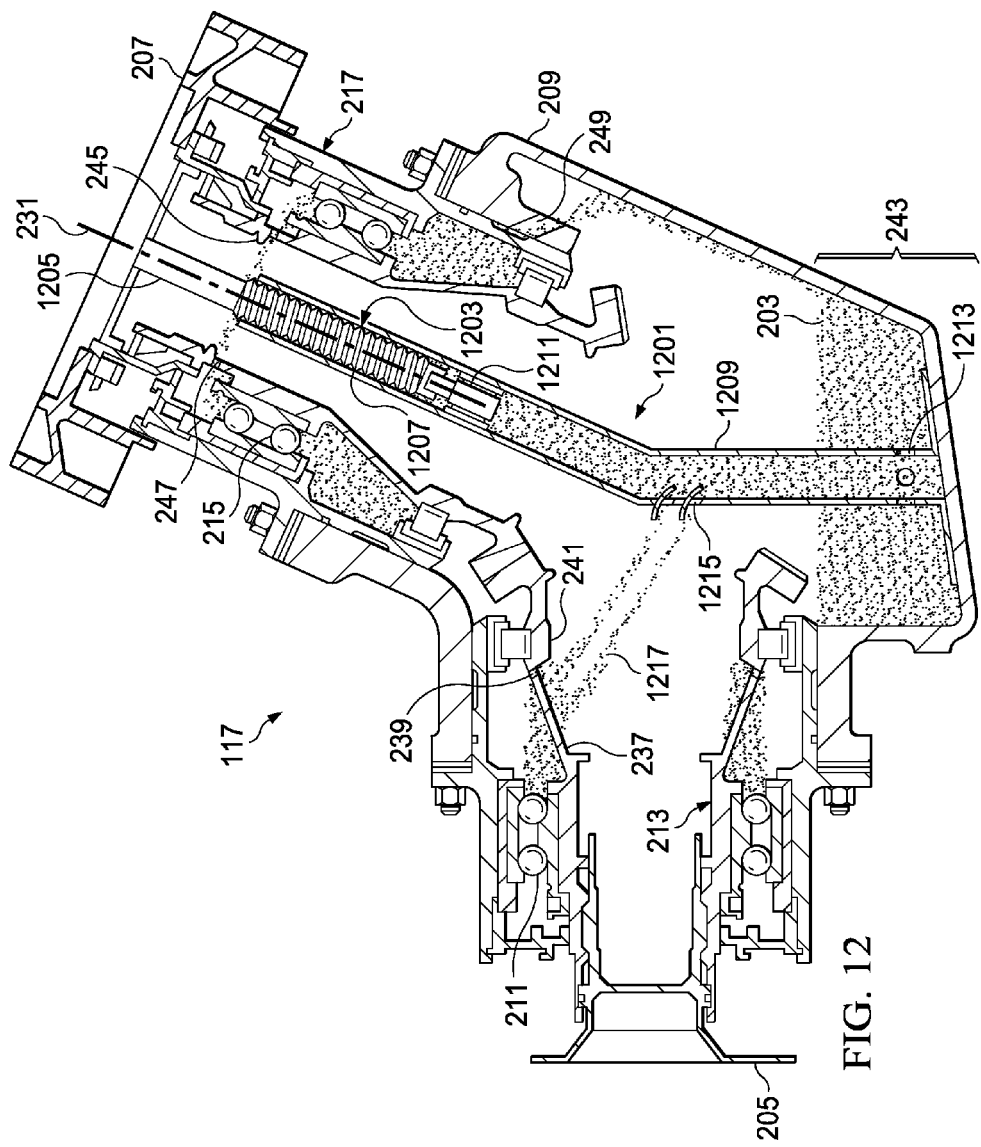
FIG. 12 is a sectional view, taken at section lines 12-12, of a device in the gearbox, according to one example embodiment.

Referring now also to FIG. 12, gearbox 117 can include a direct drive device 1201 configured to passively move fluid 203 to desired locations within gearbox 117. Device 1201 is an alternative embodiment of device 201. Similar to device 201, device 1201 is configured to move fluid 203 against the forces of gravity. Device 1201 can be categorized as direct drive, and passive, for having a fluid moving member coupled to a rotating portion of gearbox 117, which thereby passively rotates without active command, or subsequent, sequential, fluid transfer systems (e.g., fluid lines), during operation of the gearbox 117.

Gearbox 117 can include an input member 205 that is coupled to tail rotor drive shaft 119. Similarly, gearbox 117 can include an output member 207 that is coupled to tail rotor drive shaft 121. Gearbox 117 is configured to transition torque from along the axis of tail rotor drive shaft 119 to along the axis of tail rotor drive shaft 121. The gearbox 117 can include a housing 209. Input rotating member 213 is rotatable relative to housing 209 with an input duplex bearing 211 operably associated therebetween. Similarly, an output rotating member 217 is rotatable relative to housing 209 with an output duplex bearing 215 operably associated therebetween. During operation, it can be necessary to supply lubrication/cooling fluid 203 to bearings, seals, and other gearbox related components. In the illustrated embodiment, device 1201 is configured to supply lubrication/cooling fluid to input duplex bearing 211 and output duplex bearing 215. It should be appreciated that the exact configuration of device 1201 is implementation specific. Further, one of ordinary skill in art with benefit of this disclosure would recognize that device 1201 can be modified to selectively supply fluid to various components within a gearbox.

In the illustrated embodiment, device 1201 includes a screw member 1203 having a shaft 1205. Shaft 1205 is coupled to output member 207 such that shaft 1205 is rotated in conjunction with output member 207 about axis of rotation 231. In an alternative embodiment, shaft 1205 is coupled to output rotating member 217, or another rotating component within gearbox 117. Screw member 1203 has a threaded portion 1207 that resides within a casing 1209. A support member 1211 can include one or bearings so as to rotatably support shaft 1205 against casing 1209. Casing 1209 has an inlet 1213 submerged within reservoir 243.

During operation, screw member 1203 rotates in conjunction with output member 207. The exact rotational speed of screw member 1203 and output member 207 is implementation specific, but in one example embodiment, screw member 1203 and output member 207 rotate at approximately 4500 revolutions per minute. Rotation of screw member 1203 draws fluid 203 up into casing 1209 through inlet 1213 by the lifting of fluid 203 with threaded portion 1207. Once fluid 203 has traveled to the upper portion of casing 1209, centrifugal forces throw fluid 203 radially outward onto the inner surface of output rotating member 217. Fluid 203 can then travel through passage 247 and onto output duplex bearing 215. Dam 245 can be integrated into output rotating member 217 to prevent fluid 203 from flowing past passage 247. Fluid 203 can return to reservoir 243 via passage 249.

In one example embodiment, one or more orifices 1215 can be strategically placed in casing 1209 so that a portion of fluid 203 is projected from each orifice 1215 to a desired area with gearbox 117. Orifices 1215 can be selectively sized in accordance with the desired volume of fluid 203 to be projected. In the illustrated embodiment, orifices 1215 are sized and located so that fluid streams 1217 of fluid 203 exiting from orifices 1215 are deposited on a surface 237 of input rotating member 213 before flowing through a port 239 and onto input duplex bearing 211. In the illustrated embodiment, the fluid velocity for projecting fluid streams 1217 is derived from screw member 1203. After lubricating/cooling input duplex bearing 211, fluid 203 can return to reservoir 243 via a passage. A dam member 241 can be used to direct the flow of fluid 203 through port 239.

Even though the illustrated embodiment is described using device 1201 to lubricate/cool bearings with fluid 203, device 1201 is equally adaptable to lubricate/cool other components, such as gears.

Devices 201, 701, 801, 901, and 1201 include one or more significant advantages over conventional apparatuses used to move fluid within a gearbox, such as: 1) efficiently moving fluid against gravity to desired locations within a gearbox; 2) precluding certification requirements that may be necessitated by using a conventional pump for moving fluid within a gearbox; 3) accurately moving fluid to desired locations within a gearbox; and 4) ability to catch ambient fluid and redistributing to desired locations within a gearbox.

It should be appreciated that rotorcraft 101 is merely illustrative of a wide variety of aircraft that can implement devices 201, 701, 801, 901, and 1201 in a gearbox. Other aircraft implementations can include fixed wing aircraft, tilt rotor aircraft, unmanned aircraft, gyrocopters, and spacecraft, to name a few examples. Further, even though devices 201, 701, 801, 901, and 1201 are particularly well suited for an aircraft implementation, devices 201, 701, 801, 901, and 1201 may be implemented on any mechanical system that may require fluid movement to one or more components.

The particular embodiments disclosed above are illustrative only, as the apparatus may be modified and practiced in different but equivalent manners apparent to those skilled in the art having the benefit of the teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A device for moving a fluid within a gearbox, the device comprising:
    a base portion coupled to a rotatable member within the gearbox;
    a conical portion having a scoop, the scoop being configured to capture a fluid during a rotation of the device;
    wherein the device is configured to utilize a centrifugal force for moving the fluid captured by the scoop along an interior surface of the conical portion toward the base portion.

2. The device according to claim 1, further comprising:
    an orifice located in the conical portion, the orifice configured to eject a portion of the fluid to a desired location within the gearbox as the device rotates.

3. The device according to claim 1, further comprising:
    a slot in the conical portion, the slot being configured to capture a supplemental fluid during the rotation of the device.

4. The device according to claim 1, wherein the device is configured to rotate about the same axis of rotation as the rotatable member.

5. A gearbox for an aircraft, the gearbox comprising:
    an input rotating member;
    an output rotating member;
    a housing; and
    a device for moving a fluid within the gearbox, the device comprising:
        a base portion coupled to a rotatable member within the gearbox;
        a conical portion having a scoop, the scoop being configured to capture a fluid during a rotation of the device;
        wherein the device is configured to utilize a centrifugal force for moving the fluid captured by the scoop along an interior surface of the conical portion toward the base portion.

6. The gearbox according to claim 5, the gearbox further comprising:
    a first bearing between the input rotating member and the housing; and
    a second bearing between the output rotating member and the housing.

7. The gearbox according to claim 6, wherein the device is coupled to the output rotating member.

8. The gearbox according to claim 6, wherein the device is configured to provide fluid to at least one of the first bearing and the second bearing.

9. The gearbox according to claim 5, the device further comprising:
    an orifice located in the conical portion, the orifice configured to eject a portion of the fluid to a desired location within the gearbox as the device rotates.

* * * * *